United States Patent [19]

Leister

[11] Patent Number: 4,636,362

[45] Date of Patent: Jan. 13, 1987

[54] APPARATUS FOR THE CONTINUOUS TREATMENT OF FRAGMENTED FUEL ELEMENTS

[75] Inventor: Peter Leister, Waldbronn, Fed. Rep. of Germany

[73] Assignee: Deutsche Gesellschaft, Fed. Rep. of Germany

[21] Appl. No.: 624,612

[22] Filed: Jun. 26, 1984

[30] Foreign Application Priority Data

Jul. 4, 1983 [DE] Fed. Rep. of Germany ....... 3324020
Dec. 24, 1983 [DE] Fed. Rep. of Germany ....... 3347008

[51] Int. Cl.⁴ .................. B01D 11/02; B08B 3/08
[52] U.S. Cl. .................. 422/105; 422/159; 422/268; 422/287; 422/304; 422/903; 134/70; 134/113; 134/124; 134/128
[58] Field of Search .............. 422/108, 115, 268, 287, 422/304, 903, 159, 107, 105; 134/70, 113, 124, 128; 198/619

[56] References Cited

U.S. PATENT DOCUMENTS

| | | | |
|---|---|---|---|
| 889,120 | 5/1908 | Gormly | 422/268 |
| 2,512,710 | 6/1950 | Beeson | 422/268 |
| 2,517,143 | 8/1950 | Straight | 422/268 |
| 3,279,890 | 10/1966 | Szasz et al. | 422/268 |
| 3,616,978 | 11/1971 | Haslam | 198/619 |
| 4,435,363 | 3/1984 | Boldt | 422/287 |

*Primary Examiner*—David L. Lacey
*Attorney, Agent, or Firm*—Allegretti, Newitt, Witcoff & McAndrews, Ltd.

[57] ABSTRACT

Apparatus for treating radioactive comminuted fuel elements with hot nitric acid comprising an endless conveyor which carries the fuel fragments through a U-shaped jacketed tube counter to the flow of acid. The conveyor travels in a conduit which connects to the ends of the U-shaped tube to form a continuous loop. Downstream of the U-shaped tube associated with the conduit is a washing unit, a drying unit, and a discharge unit. Upstream of the U-shaped tube is a feed unit which joins the conduit. A radioactive fission material sensor is located just ahead of the discharge unit and serves to actuate a switch to recycle treated fragments that may still be radioactive. Drive apparatus for the conveyor comprises permanent magnets mounted at spaced intervals on the conveyor and exciter windings surrounding said U-shaped tube to direct forward movement.

21 Claims, 4 Drawing Figures

APPARATUS FOR THE CONTINUOUS TREATMENT OF FRAGMENTED FUEL ELEMENTS

The invention relates to an apparatus for the continuous treatment of fragmented radioactive fuel elements which have been removed from a reactor and ground up in a comminuting apparatus. The apparatus is used to separate fissionable material from the fragments by dissolving in acid.

Such an apparatus is known from British Pat. No. 10 64 593, with which the fuel element fragments are delivered by way of a down pipe into a screw conveyor, which comprises two separate screw or worm units which are arranged parallel and connected following one another. The one screw unit is arranged in a dissolving acid chamber, and the other screw unit is arranged partly in a rinsing chamber provided with a discharge opening for can fragments which have been leached out. There is an interruption in the transport at the transition from one screw unit to the other and respectively with the transition from the dissolving acid chamber to the rinsing chamber. A section of the mounting of the screw is exposed to the aggressive dissolving acid, as a consequence of which this mounting is exposed to a high degree of wear. Problems as regards the transporting can arise with the transfer from one screw to the other. The dissolving acid is supplied less effectively when using the parallel flow principle.

An apparatus for the continuous dissolving for fuel element fragments is known from European Pat. No. OS 00 30 884, which apparatus uses a bucket wheel, which is arranged to be rotatable in a dissolving acid container. The driving means which engage the external circumference of the wheel and the means for guiding the wheel are arranged above the level of the dissolving acid. The fragments of the fuel elements drop from a down tube into the dissolving acid and then descend into the bucket. Because of splashes of acid and acid residues adhering to the wheel, there is the danger of the guiding means and driving parts coming into contact with the acid, as a consequence of which there is an increased danger of wear. No integrated aftertreatment of leachedout can fragments is provided.

An apparatus for the continuous dissolution of fuel element fragments is known from European Pat. No. OO 09 868, with which a combined pneumatic and hydraulic conveyor is supplied by way of a plurality of V-shaped pipe conduits arranged in series. Dissolving acid and fuel element fragments are introduced into the apparatus by the less effective parallel flow principle. The acid containing the fuel elements in solution is discharged together with the can fragments at the end of the apparatus. There is no provision for a separation of the can fragments from the fuel-containing acid, or for an aftertreatment of the can fragments.

The known apparatus employ known conventional driving means. It has now been shown that these conventional driving systems are subject to a very high degree of wear, on account of the radioactive loading in the operating chambers (so-called hot cells). The conventional driving means comprise a number of structural components which have only short effective lives, as a consequence of the charging with radioactive radiations. It is consequently necessary for these driving means to be continuously renewed, and at very short time intervals, the consequence being that the operating periods are relatively short. This is a disadvantage, for economic reasons and for technical safety reasons. Each time the apparatus has to be switched off a relatively long period of time is involved in the replacement of the drive means or of the structural parts which have become worn. A replacement by remote manipulation can only be carried out with difficulty.

It is the object of the present invention to construct a simplified apparatus of the type referred to, in which the transporting and the dissolving of the fuel element fragments, and also the aftertreatment of the leached-out can fragments, can be carried out in a single working step, while avoiding the disadvantages of the known apparatus.

Furthermore, the apparatus is to be so improved that the susceptibility to wear is reduced, and a replacement can be carried out more easily, more quickly, and more especially by remote manipulation.

In accordance with the invention, the transporting of the fuel element fragments and the can fragments through the dissolving unit and the aftertreatment unit is carried out simultaneously with the single continuously operated charging and transporting means comprising a U-shaped hollow member enclosing a mechanical conveyor. The apparatus is simple in construction and reliable in operation. It can be manufactured in a relatively compact manner. The maintenance of geometrically and critically safe dimensions is not a problem, even with apparatus for relatively large throughputs. The construction for the dissolving unit in the form of a U-shaped hollow body is advantageous from the point of view of manufacture and effectiveness of the chemical dissolution. The connection with the other stations on the input side and output side is constructed in a particularly simple manner. A gradual alteration of the throughput is possible in a simple manner with the construction according to the invention. A uniform yield of dissolver gas and can fragments is produced. Assembly and dismantling operations, and also repairs and replacements of parts, can be carried out easily and quickly. By the construction according to the invention, any discontinuous remote manipulating steps, and also discontinuous processing steps, are avoided. The apparatus according to the invention offers maximum possible safety.

Particularly expedient transporting means which may advantageously be used comprise an endless chain carrying perforated spaced discs to provide chambers therebetween for the fuel element fragments. The chain is enclosed in a hose formed from a web of perforated wire fabric.

An increased efficiency of the chemical dissolving procedure can be produced by providing means for flowing acid counter to the flow of fuel element fragments, and for heating the acid.

In order to detect treated can fragments still containing residual fission material, and once again to feed them to the dissolving process, a switching device is provided at the discharge end of the conveyor to recycle these fragments in response to a radioactive sensor control means.

An expedient and advantageous drive means for the continuous conveyor comprises permanent magnets on the chain and cooperating exciter windings outside the conveyor. The magnets may have a refined steel casing and be integrated with the perforated discs. This drive means has a long life and thus ensures periods of long operation. A replacement of parts of the drive means can be carried out easily and quickly and, above all, with the use of remote manipulation techniques.

The invention is now to be more fully explained by reference to specific illustrative examples which are shown diagrammatically in the accompanying drawing, wherein.

Figure 1:
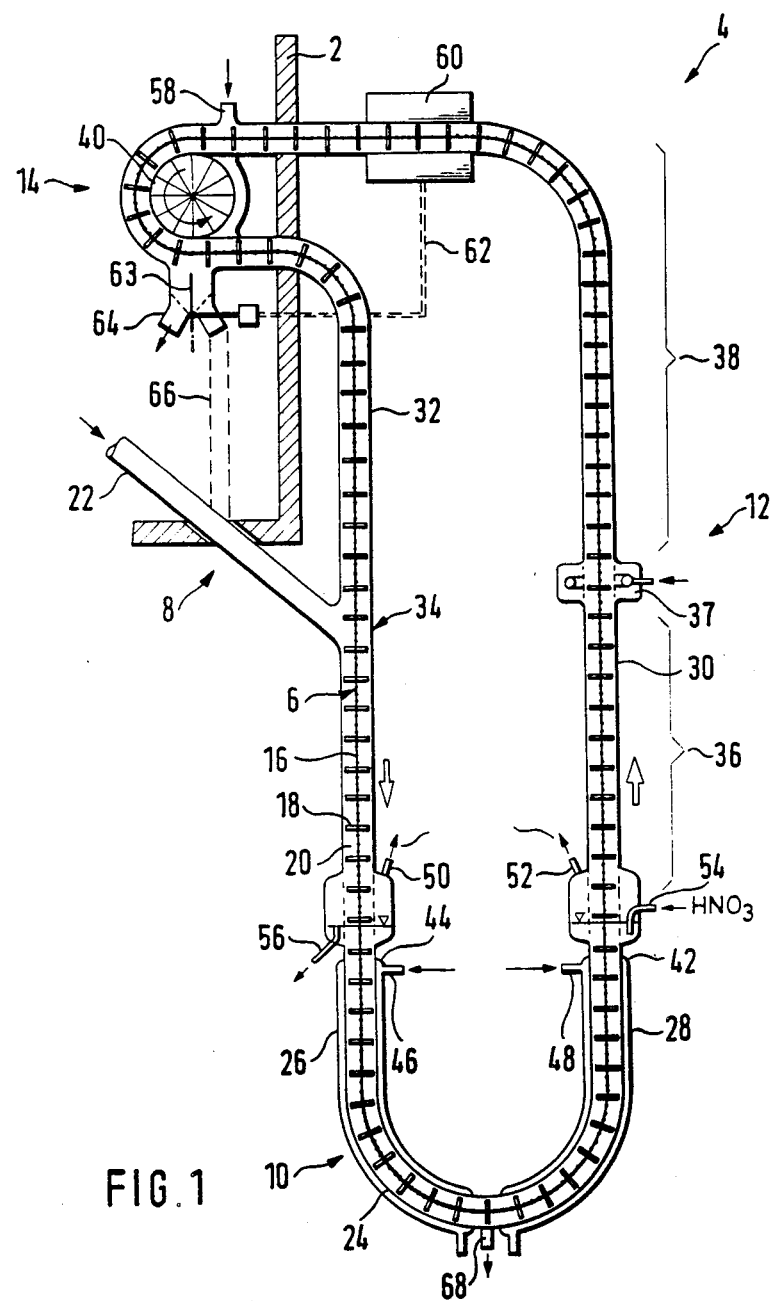
FIG. 1 is a diagrammatic view of a first embodiment of the apparatus according to the invention for the continuous treatment of fuel element fragments.

FIG. 1 shows diagrammatically a cell wall 2, which separates two screened or shielded cells (working chambers) from one another, and in one of which is arranged an apparatus 4 for the continuous treatment of radioactive fuel element fragments. The apparatus 4 comprises a continuously operating transporting device 6, which runs in a closed circuit through a charging or feeding unit 8, a dissolving unit 10, an after treatment unit 12, a discharge unit 14, and back to the feeding unit 8.

The transporting device 6 is a so-called continuous conveyor, which comprises an endless chain 16 guided in a tubular housing, apertured discs or plates 18 being arranged in spaced relation on said chain, two adjoining apertured plates always forming conveyor chambers 20 for accommodating and transporting the fuel element fragments being treated.

The fuel element fragments come from a comminuting apparatus (not shown) and are supplied by way of a gravity pipe 22.

The dissolving unit 10 consists of a U-shaped tube 24, into one arm 26 of which opens the gravity pipe 22. The other arm 28 of the U-shaped tube 24 is connected to the discharge unit 14 by a delivery pipe 30 which is of the same diameter and which passes through the aftertreatment unit 12. A pipe connection 32 leads from the discharge unit 14 back to the feeding unit 8, in such a way that the transporting device or conveyor 6 circulates in a closed housing.

Provided on the gravity pipe 22 or on the feeding unit 8 is a channeling device 34, which here is simply a pipe conduit leading into the gravity pipe 22, through which conduit the conveying or transporting elements 18 of the continuous conveyor 6 are channeled into the gravity pipe 22.

The aftertreatment unit 12 consists of a flushing or rinsing station 36 supplied with rinsing liquid from dispenser 37, and a drying station 38.

The continuous conveyor according to FIG. 1 is driven by a drive means 40, which is arranged in the region of the discharge unit 14.

The U-pipe 24 of the dissolving unit 10 is traversed on the counter-current principle by a dissolving acid, which here is boiling nitric acid. The nitric acid is introduced at the end 42 of the dissolving unit and leaves the latter at the opposite end 44. The U-pipe 24 of the dissolving unit 10 is capable of being heated or cooled through pipes 46,48. Exhaust gases are drawn off through an exhaust gas unit 50,52.

The fuel element fragments supplied by way of the gravity pipe 22 are transported by the continuous conveyor into the U-pipe 24, in which the fuel contained in the cans is reacted with the nitric acid and dissolved.

The fuel element fragments are moved in counter-current to the dissolving acid which, as already mentioned, is fed in through a pipe 54 at the end 42 of the member 28. The fuel solution leaves at the opposite end 44 from a pipe 56, at the point where the can fragments enter the dissolving unit.

The leached-out cans of the fuel element fragments, which are carried out from the dissolving unit 10 by the continuous conveyor into the pipe 30, first of all travel through the rinsing station 36 and thereafter through the drying station 38. The drying is also effected in countercurrent, by air being blown into the drying station from the discharge unit 14 by way of a connecting pipe 58.

Along the route to the discharge device 14, the can fragments pass through a control unit 60 for residual fission material, the said unit, by way of a pipe 62, controlling a switching device 63 arranged in a discharge nozzle 64 in such a manner that when residual fission material is detected, the can fragments are channeled through a recycle conduit 66 back into the gravity pipe 22 for the renewed dissolving of said material in the dissolving unit 10. If no residual fission material is detected, the said can fragments pass on for the treatment of waste.

Differently from what is shown in FIG. 1, the drive means 40 may also be arranged in the region of the channeling device 34.

In order also to be able to remove insoluble fine substances which accumulate in the U-tube 24 of the dissolving unit, a drain outlet 68 is provided at the lowest point of the U-tube 24, through which such fine substances can be drawn off at intervals. In order to improve the confining of the fuel, a stream of gas or air is conducted into the U-tube 24 at the positions where the can fragments enter, and also the positions where they leave the dissolving unit 10. The outlet in this case is by way of the waste gas outlet 50,52 of the dissolving unit.

Figure 2:
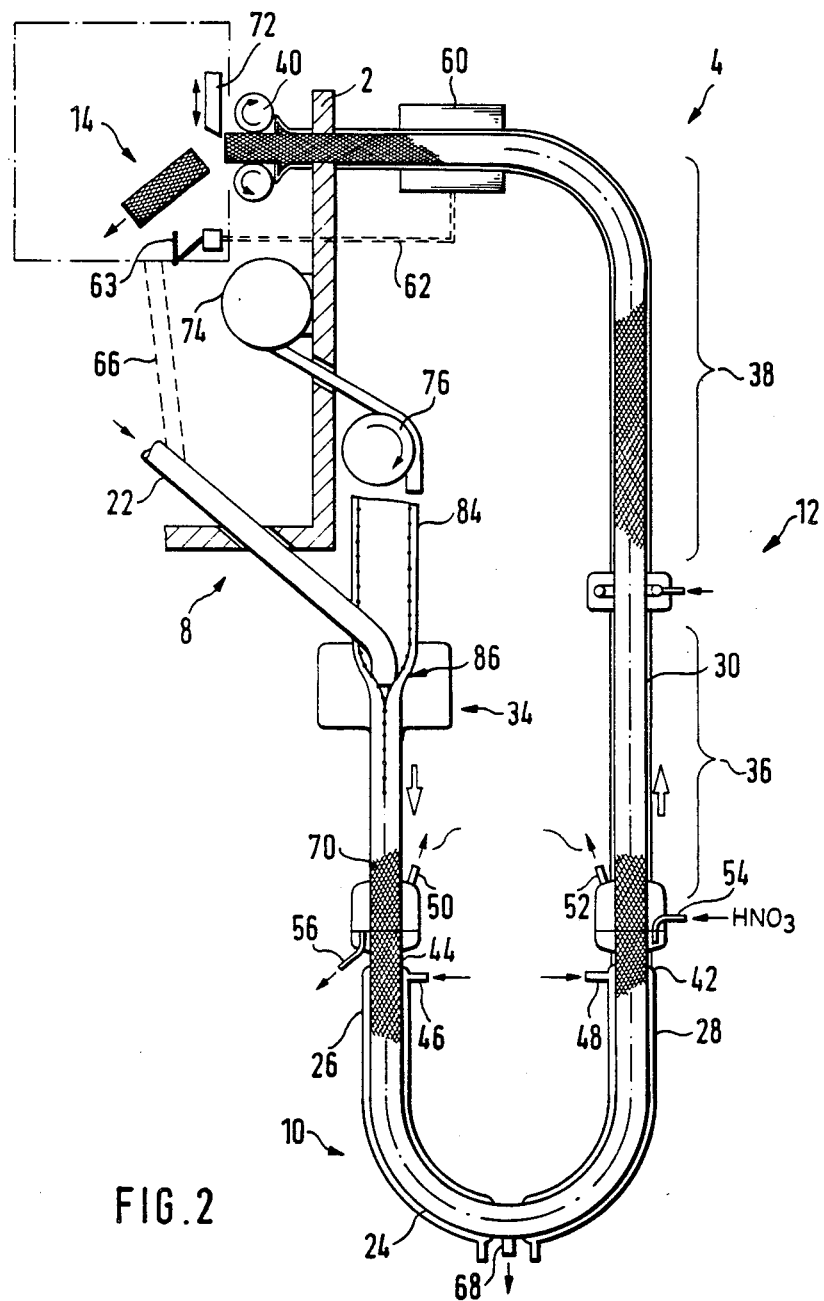
FIG. 2 is another embodiment of the apparatus according to the invention.
Figure 3:
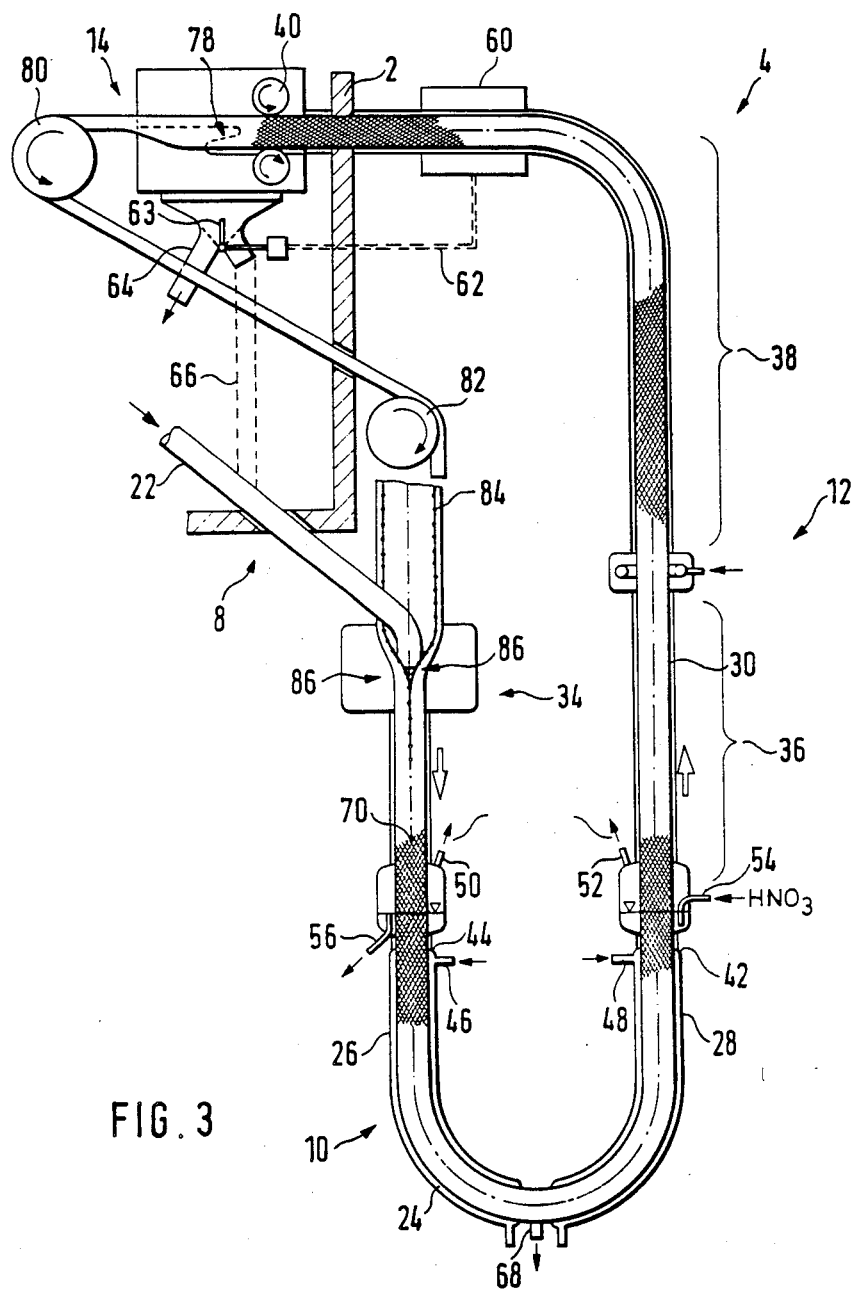
FIG. 3 is yet another embodiment of the apparatus according to the invention.

The apparatus 4 according to FIGS. 2 and 3, differs essentially from the apparatus according to FIG. 1 by using a hose conveyor as the continuous conveyor. The channeling device 34 arranged on the gravity pipe is here provided with a device 86 which forms a continuous length of flat flexible wire fabric web or a flat flexible perforated sheet metal web into a tube and seals it, which tube is thereafter channeled around the end of the gravity pipe so that the fuel element fragments supplied through the gravity pipe 22 are held, tightly enclosed, and in this way are transported through the dissolving unit 10 and the following aftertreatment stations, in the manner which has already been described in connection with the constructional form according to FIG. 1 to the description of which reference is made in this connection.

With the constructional form according to FIG. 2, the can fragments, free from residual fissionable material, are further transported in this form for the treatment of waste, this being by pieces of the hose being cut off by a cutting mechanism in the discharge unit 14 and advanced for the waste treatment. With this method of procedure, the can fragments are, as it were, delivered in package form. In order to make continuous operation possible, a supply reel 74 of fabric or perforated sheet metal is provided, from which the said web of fabric or sheet metal is supplied by way of a guide roller 76 to the channeling device 34, or respectively, the device 86.

The dimensions of the fabric or of the perforated sheeting are so chosen that the can fragments are not able to come into contact with the wall of the U-tube of the dissolving unit 10 or the walls of the gravity pipe or of the discharge pipe, but the dissolving acid (nitric acid) is able to flow practically unhindered to the can fragments.

The constructional form according to FIG. 3 differs from that according to FIG. 2 by the fact that the conveyor hose 70 is operated as an endless conveyor. For this purpose, a means 78 for opening the hose is provided at the discharge unit 14, so that the can fragments transported by the hose are able to be supplied by way of the discharge unit 14 and in the manner already described (FIG. 1) for the treatment of waste or for the renewed dissolving operation. The hose opened by the hose opening means 78 is guided over two guide rollers 80,82 once again to the hose-forming and hose-sealing device 86 at the channeling device 34.

Figure 4:
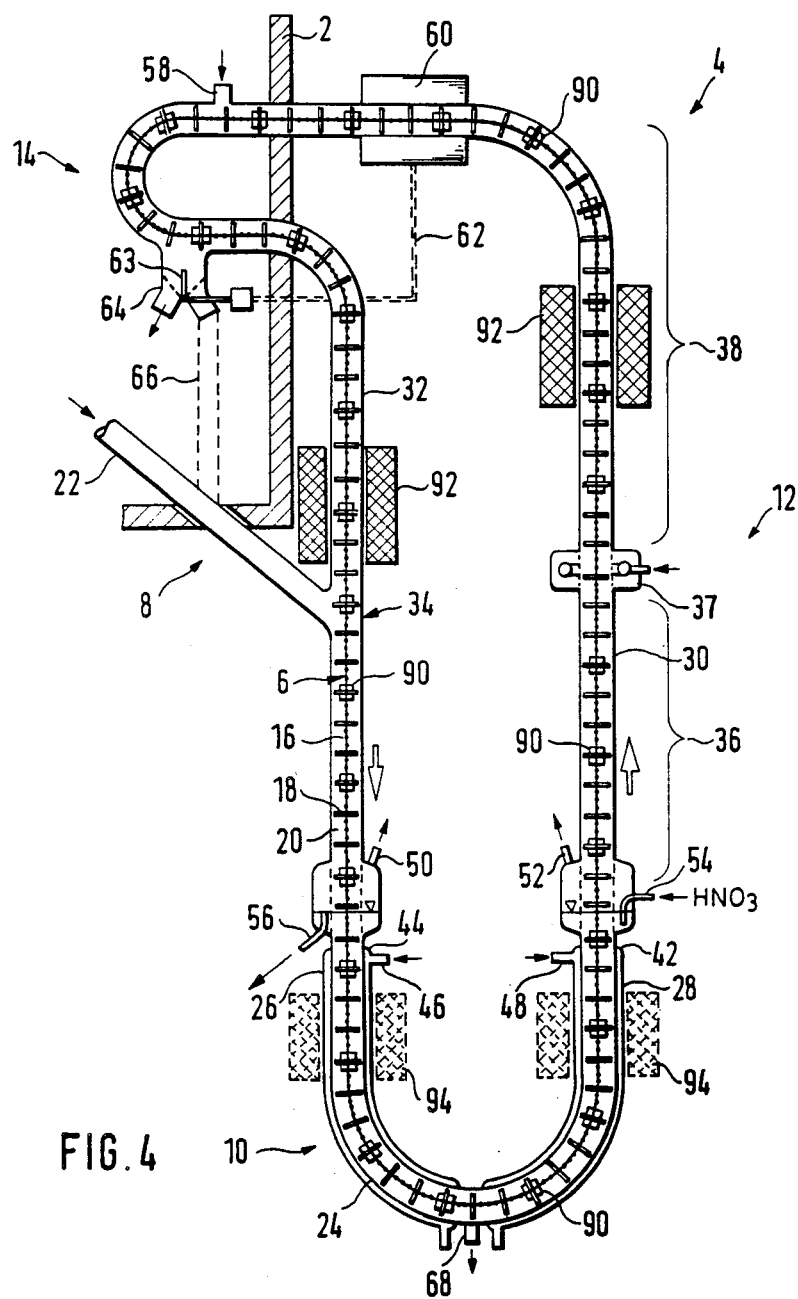
FIG. 4 is the apparatus according to FIG. 1 with a special drive means.

Instead of the conventional drive means which is shown in FIG. 1, the driving of the perforated disc or plate chain 16 of the continuous conveyor 6 can also be effected by placing along the entire chain 16 and at certain distances relative to one another, permanent magnets 90 lined with high-grade steel, arranged on the perforated discs or plates 18, and a plurality of electric exciter windings 92 are arranged at certain positions around the transporting device 6, which windings, in conjunction with the permanent magnets, make possible a directed advance of the chain (see FIG. 4). The exciter windings can also be arranged only around the dissolving pipe or tube 24, see reference number 94 (excited windings indicated diagrammatically in broken lines).

I claim:

1. In an apparatus for continuous treatment of fragmented radioactive fuel elements consisting of comminuted cans and fuel comprising a continuous conveyor which is at least enclosed by and arranged to move through a dissolving unit, a washing unit, a drying unit, and a discharge unit, disposed successively along the length of the conveyor, the improvement comprising
   (a) a U-shaped hollow member as the enclosing dissolving unit,
   (b) a feeding unit for discharging said elements onto said continuous conveyor at a point upstream of said dissolving unit, and
   (c) means for advancing said conveyor through said U-shaped hollow member, and said washing, drying, and discharge units.

2. The apparatus of claim 1 in which said hollow member is a U-shaped tube slightly larger in diameter than the maximum cross-sectional dimension of said continuous conveyor.

3. The apparatus of claim 1 in which said conveyor comprises an endless chain having spaced perforated plates mounted thereon to provide chambers between said plates for said fuel element fragments.

4. The apparatus of claim 3 in which said means for advancing includes drive means for said conveyor comprising permanent magnets arranged facing one another at pre-determined intervals on said perforated plates along said chain, and exciter windings surrounding said conveyor said windings being located at points spaced along the length of the conveyor.

5. The apparatus of claim 4 in which said permanent magnets have a casing of refined steel.

6. The apparatus of claim 4 in which said permanent magnets are integrated into said perforated plates.

7. The apparatus of claim 4 in which said exciter windings are arranged around said U-shaped member.

8. The apparatus of claim 1 in which said conveyor comprises a hose formed from a flat flexible perforated web for enclosing the fuel element fragments.

9. The apparatus of claim 8 in which said web is a wire fabric.

10. The apparatus of claim 8 in which said web is perforated sheet metal.

11. The apparatus of claim 8 which includes means for forming and sealing said web into said hose, which means is located adjacent the point said feeding unit discharges said elements.

12. The apparatus of claim 11 which includes means disposed between said discharge unit and said feeding unit for opening said hose and guiding it back to said feeding unit.

13. The apparatus of claim 11 which includes downstream of said discharge unit means for cutting off sections of said hose, and a supply roller for feeding fresh web to said forming and sealing means.

14. The apparatus of claim 1 in which said feeding unit is a down pipe.

15. The apparatus of claim 14 in which the downstream end of said U-shaped member connects to said discharge unit by means of a delivery pipe through which the conveyor travels, said delivery pipe including said washing and drying units.

16. The apparatus of claim 1 in which said U-shaped hollow member has an upstream end and a downstream end and which includes means for introducing acid into said downstream end for flow counter-current to the advance of said fuel element fragments through said member.

17. The apparatus of claim 1 which includes a jacket constructed to contain a heating or cooling fluid and which surrounds said U-shaped hollow member.

18. The apparatus of claim 17 which also includes means for blowing air into both ends of said U-shaped member and for venting said member.

19. The apparatus of claim 1 which includes a recycle conduit in flow communication with said discharge unit and said feeding unit and a switching device at said discharge unit for channeling treated fragments through said recycle conduit back to said feeding unit, and control means connected to said switching device, said control means being sensitive to residual fissionable material and located upstream of said discharge unit for actuating said switching device.

20. The apparatus of claim 1 in which said means for advancing includes at the discharge unit drive means for the conveyor.

21. The apparatus of claim 1 which includes at the lowest point of said U-shaped member drain means for removing insoluble fine substances from said member.

* * * * *